United States Patent
Tsutaya et al.

(10) Patent No.: US 7,334,487 B2
(45) Date of Patent: Feb. 26, 2008

(54) LOAD CELL WITH ROBERVAL MECHANISM

(75) Inventors: Takao Tsutaya, Shiroi (JP); Yuzo Yabe, Tsurugashima (JP)

(73) Assignee: Tanita Corporation, Tokyo (JP)

( * ) Notice: Subject to any disclaimer, the term of this patent is extended or adjusted under 35 U.S.C. 154(b) by 111 days.

(21) Appl. No.: 11/196,347

(22) Filed: Aug. 4, 2005

(65) Prior Publication Data
US 2006/0027032 A1    Feb. 9, 2006

(30) Foreign Application Priority Data
Aug. 5, 2004    (JP) .............................. 2004-228925

(51) Int. Cl.
*G01L 1/22*    (2006.01)
(52) U.S. Cl. .............................. 73/862.044; 73/862.045
(58) Field of Classification Search ........... 73/862.041, 73/862.042, 862.043, 862.044, 862.045
See application file for complete search history.

(56) References Cited
FOREIGN PATENT DOCUMENTS

| | | |
|---|---|---|
| JP | 63-079027 | 4/1988 |
| JP | 10104092 A | * 4/1998 |
| JP | 2000-214008 | 8/2000 |

OTHER PUBLICATIONS

English Translation of JP 10104092 A. Translated Jul. 2007 by FLS Translations, Inc.*

* cited by examiner

*Primary Examiner*—Edward Lefkowitz
*Assistant Examiner*—Punam Patel
(74) *Attorney, Agent, or Firm*—McDermott Will & Emery LLP

(57) ABSTRACT

Disclosed is a load cell including a Roberval mechanism having two parallel arms between a fixed end and a movable end, and four strain-generating portions, arranged such that two of the strain-generating portions are coupled to each other on each of the two arms. In certain embodiments, the four strain-generating-portions all have the same thickness, and the two arms include a first arm having strain gauges adhered to each of two of the strain-generating portions coupled to each other, and a second arm having a thickness smaller than that of the first arm.

4 Claims, 11 Drawing Sheets

NON-LINEARITY DEPENDING ON LOADING POSITIONS
(PRIOR ART LOAD CELL OF VERTICALLY SYMMETRICAL TYPE)

OFFSET LOADING ERROR
(LOAD CELL IN WHICH ARMS AND STRAIN-GENERATING
-PORTIONS HAVE DIFFERENT THICKNESS)

FIG.11

OFFSET LOADING ERROR
(LOAD CELL OF PRESENT INVENTION)

ANALYTICAL RESULT OF STRESS DISTRIBUTION IN EACH STRAIN-GENERATING
-PORTION WHEN LOAD IS APPLIED TO LOADING POSITION P5
(LOAD CELL IN WHICH ARMS AND STRAIN-GENERATING-PORTIONS
HAVE DIFFERENT THICKNESS)

FIG.14

ANALYTICAL RESULT OF STRESS DISTRIBUTION IN EACH STRAIN-GENERATING
-PORTION WHEN LOAD IS APPLIED TO LOADING POSITION P5
(LOAD CELL OF PRESENT INVENTION)

FIG.15

PRIOR ART

LOAD CELL WITH ROBERVAL MECHANISM

BACKGROUND OF THE INVENTION

1. Field of the Invention

The present invention relates to a load cell comprising a Roberval mechanism made up of two parallel arms and of four strain-generating-portions provided in such way that two strain-generating-portions are coupled to each other on each of the two arms.

2. Prior Art

Figure 19:
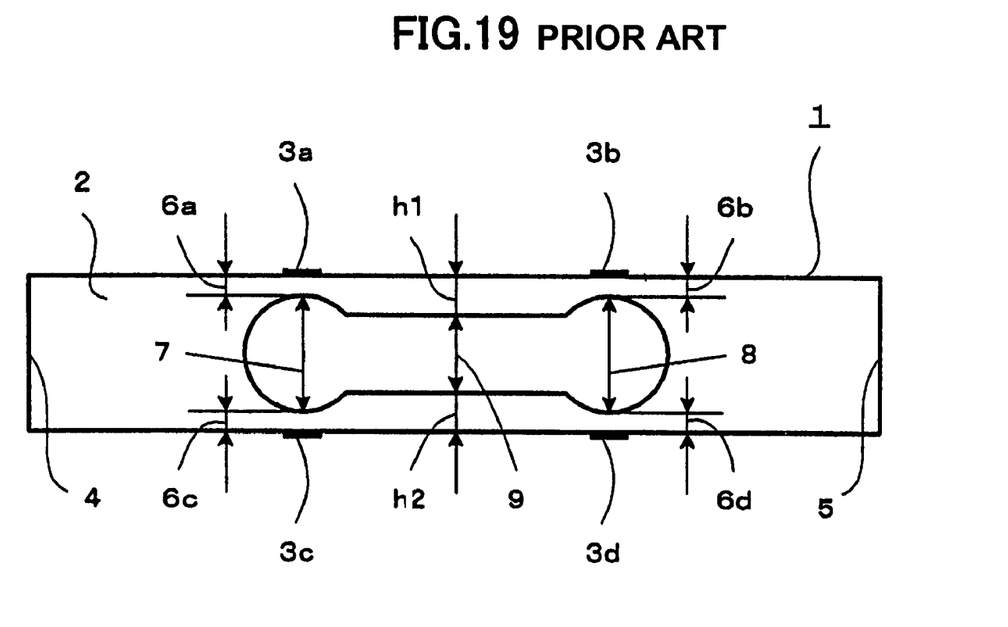
FIG. 19 is a side view of a typical load cell of Roberval type that has been used in the prior art.

A typical load cell 1 comprising a Roberval mechanism that has been used in the prior art is illustrated in FIG. 19. The load cell 1 includes a strain-generating-body 2 and strain gauges 3a, 3b, 3c and 3d. In particular, the strain-generating-body 2 includes a fixed end 4 and a movable end 5 to act as a cantilever. The strain-generating-body 2 further includes, between the fixed end 4 and the movable end 5, an aperture 7 for strain-generating-portions 6a and 6c and an aperture 8 for strain-generating-portions 6b and 6d each for detection of strain by the strain gauges adhered thereon. A channel 9 communicating between the apertures 7 and 8 is provided so that two arms h1 and h2 are arranged in parallel to each other to form links between the strain-generating-portions 6a and 6b and between 6c and 6d. As the result, a Roberval mechanism is provided in which the four strain-generating-portions 6a, 6b, 6c and 6d are each moved as a locus of each of four corners of a parallelogram. Accordingly, a degree of strain is detected by a Wheatstone bridge circuit made up of the four strain gauges. It is assumed that the strain-generating portions 6a, 6b, 6c and 6d have the same thickness and the arms h1 and h2 have the same thickness so that the load cell is formed in vertically symmetrical to the center line thereof. However, such Roberval mechanism is defective in that it has no possibility of acting as the ideal mechanism because of the fact that the links have integral construction to mutually provide adverse effect. In particular, in offset loading condition where the load is applied to any position offset from the center of the load cell, the strain-generating-portions 6a, 6b, 6c and 6d may be subjected to any moment caused by flexure of the strain-generating-body 2 that is in cantilevered form, thereby degrading the linearity between an amount of load and a detected output of the strain gauge.

Furthermore, an output circuit is formed by the Wheatstone bridge made up of the four strain gauges each adhered to each of four strain-generating-portions. Accordingly, if it is attempted to get the output from the strain gauges adhered to two strain-generating-portions of the arm at either one side, then an effect of moment caused by flexure of the strain-generating-body 2 in offset loading condition is more strongly reflected to the output, thereby further degrading the linearity.

In order to solve those problems the following techniques have been disclosed:

The first one is a load cell using a strain-generating-body comprising a Roberval mechanism, which is similar to the above-mentioned configuration, but is improved in that the thickness of strain-generating-portions 6a, 6b, 6c and 6d, or the volume constituting these portions is adjusted to control the rigidity of the strain-generating-portions 6a, 6b, 6c and 6d for deforming the strain-generating-body 2 as the ideal Roberval mechanism, thereby providing improved linearity. Such load cell can be found in Patent Document 1, for example, wherein a neutral axis of all the apertures 7, 8 and the channel 9 for forming the arms h1, h2 and the strain-generating-portions 6a, 6b, 6c and 6d is displaced from a neutral axis of the load cell itself so that there is difference in thickness between the upper and lower arms h1 and h2 and between the strain-generating-portions 6a, 6b, and 6c, 6d.

The second one is a method of manufacturing a load cell, which can be found in Patent Document 2, for example, in which it comprises the steps of: adhering strain gauges 3a and 3b only on strain-generating-portions 6a and 6b, for example; making arms h1 and h2 to have same thickness and making all the strain-generating-portions 6a, 6b, 6c and 6d to have same thickness for improvement for linearity of the load cell when detecting any strain only at one side; deriving some relation equation expressing the relationship between the thickness of the strain-generating-portions 6a, 6b, 6c and 6d and that of the arms h1 and h2 in order to eliminate any effect of moment caused by flexure of the strain-generating-body 2 forming a cantilever construction; and manufacturing load cells having same shape according to the relation equation.

Patent Document 1: Japanese Patent Laid-Open No. 2000-214008

Patent Document 2: Japanese Patent No. 2666209

However, in case of the load cell, as disclosed in Japanese Patent Laid-Open No. 2000-214008, in which the thickness of the strain-generating-portions 6a, 6b, 6c and 6d is adjusted, or both thickness of the strain-generating-portions 6a, 6b, 6c and 6d and of the arms h1 and h2 are adjusted together, the present inventors have experimentally been found that, although some improved linearity may be attained for load directed to the twisted direction of the strain-generating-body 2 itself, as in the case of right and left offset loading relative to the measurement direction of the load cell, any span error due to offset loading still remains.

In addition, in case of the load cell, as disclosed in Japanese Patent No. 2666209, in order to eliminate any strain both in the strain-generating-portions and the arms due to flexure of the entire strain-generating-body 2, the upper and lower arms h1 and h2 and the strain-generating-portions 6a, 6b, 6c and 6d are made to have same thickness. Then, the thickness of both the upper and lower arms h1 and h2 are thinner relative to the thickness of the entire strain-generating-body 2, thereby leading to increase in flexure of the entire detector device. As the result, the natural frequency of the load cell becomes lower, and therefore, any oscillation in measurement environment is likely to be picked up to produce any disturbed output signal. Furthermore, because of longer period of time taken before load becomes stable the increased measurement time may be necessary. In addition, to keep the thickness of the arms, the strain-generating-body having larger size becomes necessary, which does not lend itself to provide lower profile construction and miniaturization.

In view of the above an object of the present invention is to solve the above-mentioned prior art problems by providing an improved load cell of Roberval type having strain gauges adhered to strain-generating-portions on one of two arms wherein the strain-generating-portions all have the same thickness and the two arms have different thickness in order to mitigate any effect of flexure of the strain-generating-body.

SUMMARY OF THE INVENTION

In order to attain such object the present invention provides a load cell comprising a Roberval mechanism made up of two parallel arms between a fixed end and a movable end and of four strain-generating-portions provided in such way that two strain-generating-portions are coupled to each other on each of said two arms, wherein said four strain-generating-portions all have the same thickness; and said two arms includes a first arm having strain gauges adhered to each of said two strain-generating-portions coupled to each other and a second arm having the thickness smaller than that of the first arm.

According to one embodiment of the present invention the load cell may be fixed with a strain gauge adhesion surface of said first arm vertically upwardly directed, and a load may be vertically downwardly applied from over the first arm.

According to another embodiment of the present invention said second arm may be formed in such way that a neutral axis of a channel between the two arms is displaced from a neutral axis of the load cell itself by the predetermined distance, without any change in width of the channel, starting from such load cell that the two arms have the same thickness.

According to further embodiment of the present invention said second arm may be formed in such way that only the second arm is reduced in thickness, starting from such load cell that the two arms have the same thickness.

EFFECT OF THE INVENTION

The present invention is directed toward a load cell comprising a Roberval mechanism made up of two parallel arms between a fixed end and a movable end and of four strain-generating-portions provided in such way that two strain-generating-portions are coupled to each other on each of the two arms. According to the present invention, said four strain-generating-portions all have the same thickness, and said two arms includes a first arm having strain gauges adhered to each of said two strain-generating-portions coupled to each other and a second arm having the thickness smaller than that of the first arm. Therefore, in offset loading condition, at least one of compressive, tensile and twisting force due to flexure of the entire cantilever may be applied to the two arms, thereby collapsing the Roberval mechanism. But, such force due to flexure of the entire cantilever is mainly supported by the second arm, rather than the first arm, so that any strain produced in the strain-generating-portion of the first arm is balanced to keep the linearity and span performance. As compared to the case where both two arms are made thinner on the basis of the thickness of the strain-generating-portions, the present invention provides no possibility of significant change in natural frequency of the load cell, which substantially prevents occurrence of such problems that any oscillation in measurement environment is likely to be picked up, longer period of time is necessary before load becomes stable, and the like, for example. In addition, because of compatibility with small sized strain-generating-body and adhesion of strain gauges to only two positions on the first arm, the present invention provides lower profile construction and miniaturization of the load cell with lower manufacturing cost.

Furthermore, the load cell of the present invention may be fixed with a strain gauge adhesion surface of the first arm vertically upwardly directed, and a load may be vertically downwardly applied from over the first arm. Therefore, the load cell of the present invention can be used in the same manner as the previous load cell without any special measurement and mounting procedure.

Moreover, the second arm may be formed in such way that a neutral axis of a channel between the two arms is displaced from a neutral axis of the load cell itself by the predetermined distance, without any change in width of the channel, starting from such load cell that the two arms have the same thickness. Therefore, the present invention is applicable to small sized or lower profiled type of load cell in which the second arm has no sufficient thickness.

In addition, the second arm may be formed in such way that only the second arm is reduced in thickness, starting from such load cell that the two arms have the same thickness. Therefore, the present invention is applicable to any existing load cell in such way that the second arm thereof is cut to reduce the thickness to the predetermined value using any suitable machining tool.

BRIEF DESCRIPTION OF THE DRAWINGS

Now, the present invention will be described in more detail with reference to the accompanying drawings, in which.

BEST MODE FOR EMBODYING THE INVENTION

A load cell comprising a Roberval mechanism made up of two parallel arms between a fixed end and a movable end and of four strain-generating-portions provided in such manner that two strain-generating-portions are coupled to each other on each of said two arms, is improved according to the present invention in that:

said four strain-generating-portions all have the same thickness; and said two arms includes a first arm having strain gauges adhered to each of said two strain-generating-portions coupled to each other and a second arm having the thickness smaller than that of the first arm.

The load cell may be fixed with a strain gauge adhesion surface of said first arm vertically upwardly directed, and a load may be vertically downwardly applied from over the first arm.

Furthermore, the second arm may be formed in such way that a neutral axis of a channel between the two arms is displaced from a neutral axis of the load cell itself by the predetermined distance, without any change in width of the channel, starting from such load cell that the two arms have the same thickness.

Moreover, the second arm may be formed in such way that only the second arm is reduced in thickness, starting from such load cell that the two arms have the same thickness.

Embodiment 1

The present inventors have paid their attention to the fact that, in a load cell of Roberval type with strain gauges adhered to strain-generating-portions in one of two arms, any flexure of the entire strain-generating-body in the cantilevered form affects the upper and lower arms and the strain-generating-portions to degrade the linearity performance. Then, they have experimentally found that by making the strain-generating-portions to have same thickness, but making the upper and lower arms to have different thickness, the arm having greater thickness creates the linearity of strain in the strain-generating-portions thereof.

More concretely, it is preferable to provide proper difference in thickness between the upper and lower arms in such manner that, by making the lower arm thinner than the upper arm, the compressive and tensile force exerted in the upper and lower arms due to flexure of the entire strain-generating-body is supported mainly by the lower arm to balance the strain in the strain-generating-portions of the upper arm.

Referring now to the accompanying drawings, a load cell of the present invention will be described in more detail, on the basis of comparison data between the load cell of the present invention and a typical load cell in the prior art.

Figure 1:
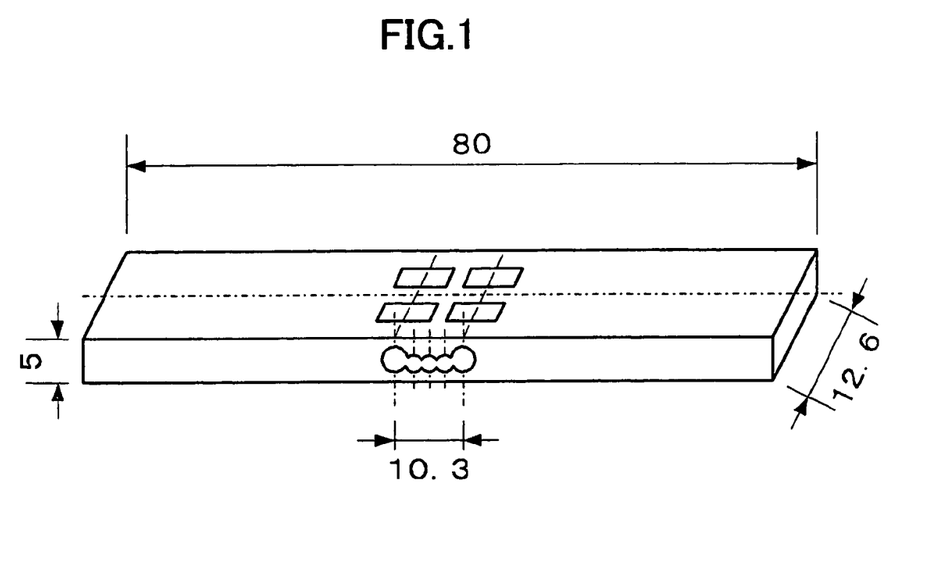
FIG. 1 is an external schematic view of a load cell according to Embodiment 1.
Figure 2:
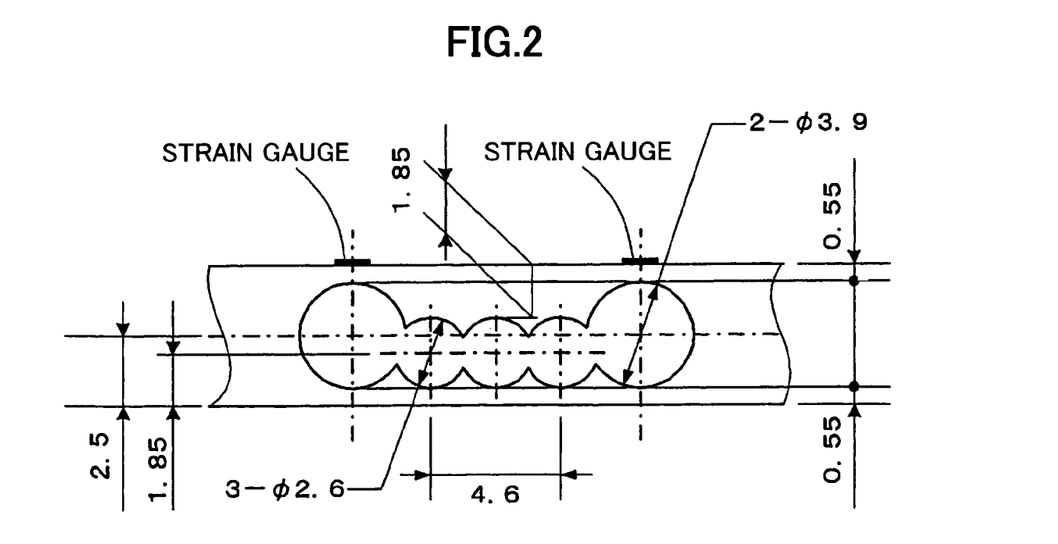
FIG. 2 is an enlarged view illustrating a main deform portion of the load cell according to Embodiment 1.
Figure 3:
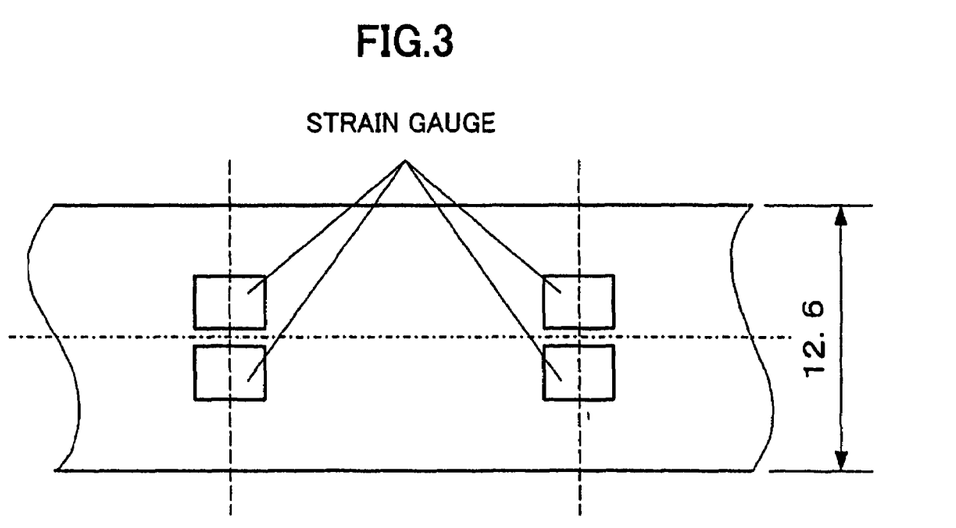
FIG. 3 is a view illustrating a strain gauge adhesion surface of the load cell according to Embodiment 1.

Embodiment 1 of the present invention is implemented in such way that a load cell is manufactured with a channel for forming arms being displaced. In particular, FIG. 1 is an external schematic view of a low profiled load cell according to Embodiment 1; FIG. 2 is an enlarged view illustrating a main deform portion of the load cell; and FIG. 3 is a view illustrating an upper surface or a strain gauge adhesion surface of the load cell.

Referring to FIG. 1, the low profiled load cell includes a strain-generating-body having a fixed end and a movable end in the longitudinal direction, which member has length of 80 mm, thickness of 5 mm, distance between the strain-generating-portions of 10.3 mm, and width of the strain gauge adhesion surface of 12.6 mm.

Referring to FIG. 2, each of four strain-generating-portions is formed to have the thickness of 0.55 mm by providing an aperture of φ 3.9 mm, and two arms are formed to have the thickness of 1.85 mm and 0.55 mm by providing a series of three apertures of φ 2.6 mm. The thicker arm having greater thickness is referred to as a "first arm", while the thinner arm having smaller thickness is referred to as a "second arm". Referring to FIG. 3, each of two strain-generating-portions coupled to each other through the first arm is provided with two strain gauges which are disposed side by side at the position near the center line of the load cell. From the view point of electrical circuit, not shown, prior art technique of configuring a bridge circuit including four strain gauges can be utilized to detect an output of the strain gauges.

Figure 4:
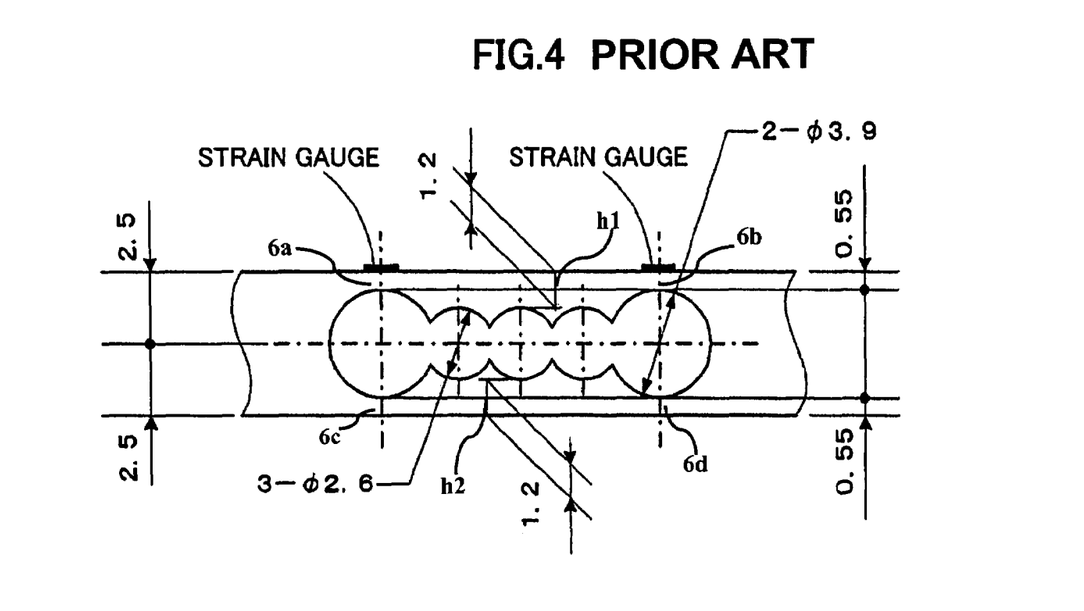
FIG. 4 is an enlarged view illustrating a main deform portion of a load cell of the prior art in which the thickness of strain-generating-portions and arms is symmetrical.

The series of three apertures for forming the first and second arms may be provided by downwardly displacing the apertures centrically formed in the prior art load cell, as shown in FIG. 4, for the purpose of providing the difference in thickness of the arms, according to the present invention. Then, the center of the apertures thus displaced is positioned at 1.85 mm from the lower surface of the load cell.

The load cell, as shown in FIG. 4, is the prior art load cell of vertically symmetrical type that includes the arms h1 and h2 having the same thickness, and the strain-generating-portions 6a, 6b, 6c and 6d having the same thickness, as has already been described. In particular, the centers of the series of three apertures for forming the first and second arms coincide with the center line of the load cell so that two arms have the same thickness of 1.2 mm. Otherwise, the remaining parts of the prior art load cell have the same configuration as the load cell of the present invention.

Comparison of non-linearity due to offset loading between the load cells of the present invention and of the prior art will be described with reference to FIGS. 5 to 8. In particular, FIGS. 5 and 6 show measurement condition such as loading position at which load is applied in offset loading, FIG. 7 is a graph illustrating non-linearity in the load cell of the prior art; and FIG. 8 is a graph illustrating non-linearity in the load cell of the present invention.

Figure 5:
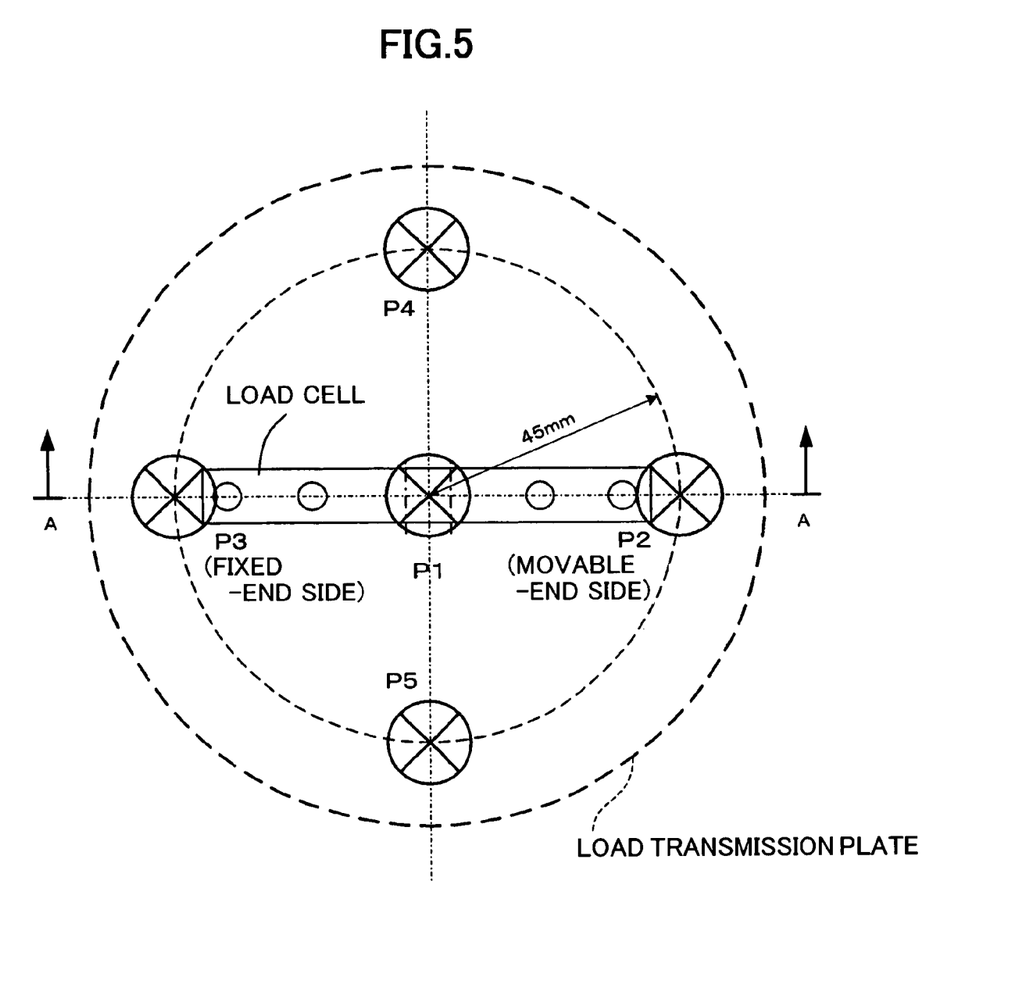
FIG. 5 is a view illustrating offset loading positions on the load cell.
Figure 6:
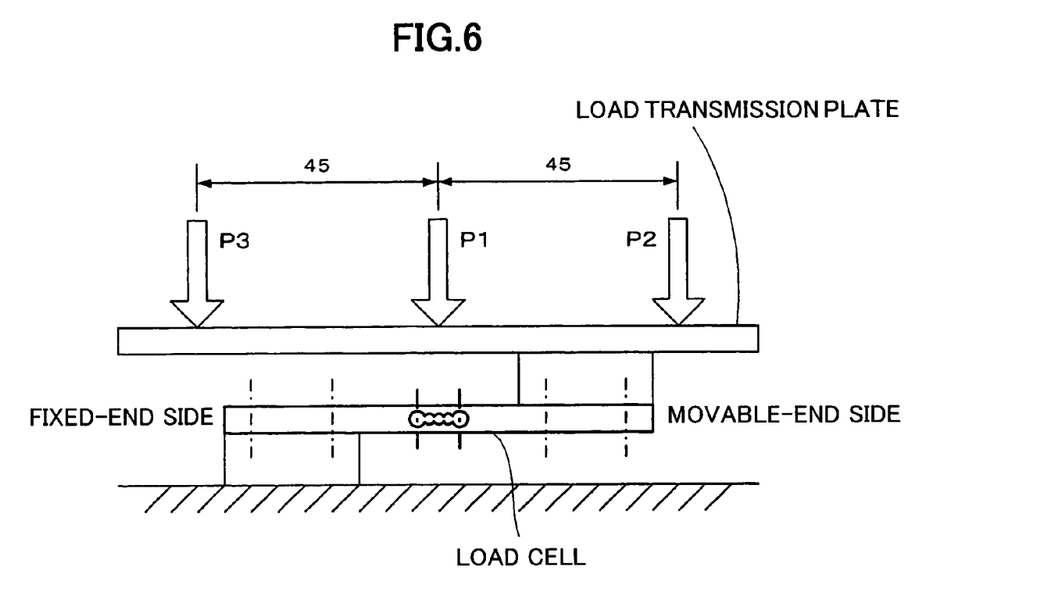
FIG. 6 is a cross section view of the load cell, taken along "A"-"A" line in FIG. 5.

FIG. 5 is a top view of the load cell illustrating the loading position at which load is applied. In this embodiment, the load cell is fixed with the strain gauge adhesion surface of the first arm vertically upwardly directed, and the load is vertically downwardly applied from over the first arm. The loading positions on a load transmission plate relative to the load cell are shown by marks "⊗" in FIG. 5. The loading position in the center of the load cell is referred to as "P1", the loading positions at 45 mm offset from "P1" in the longitudinal direction of the load cell are referred to as "P2" and "P3", and the loading positions at 45 mm offset from "P1" in the vertical direction are referred to as "P4" and "P5". In particular, "P2" is the offset loading position at the movable end of the load cell, and "P3" is the offset loading position at the fixed end of the load cell. FIG. 6 that is a cress section view of the load cell, taken along "A"-"A" line in FIG. 5, illustrates measurement condition.

In measurement of non-linearity of both load cells, a weight of 2000 g is loaded with incremental step of 500 g at the offset loading positions "P1", "P2" and "P3".

Figure 7:
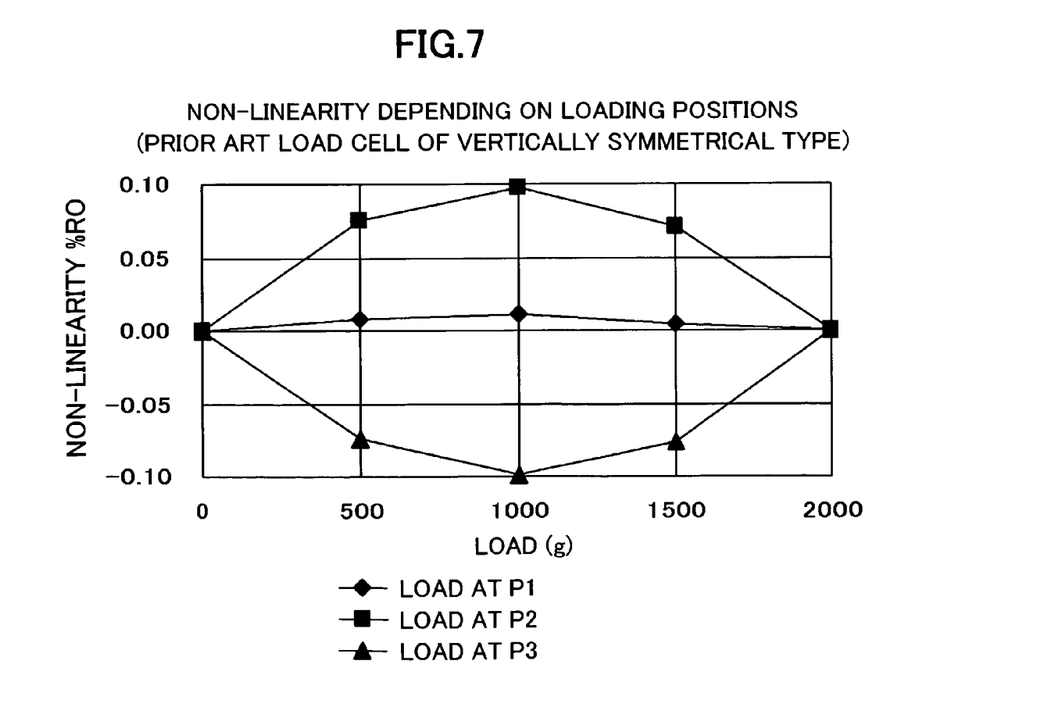
FIG. 7 is a graph illustrating non-linearity of the load cell of the prior art in FIG. 4.
Figure 8:
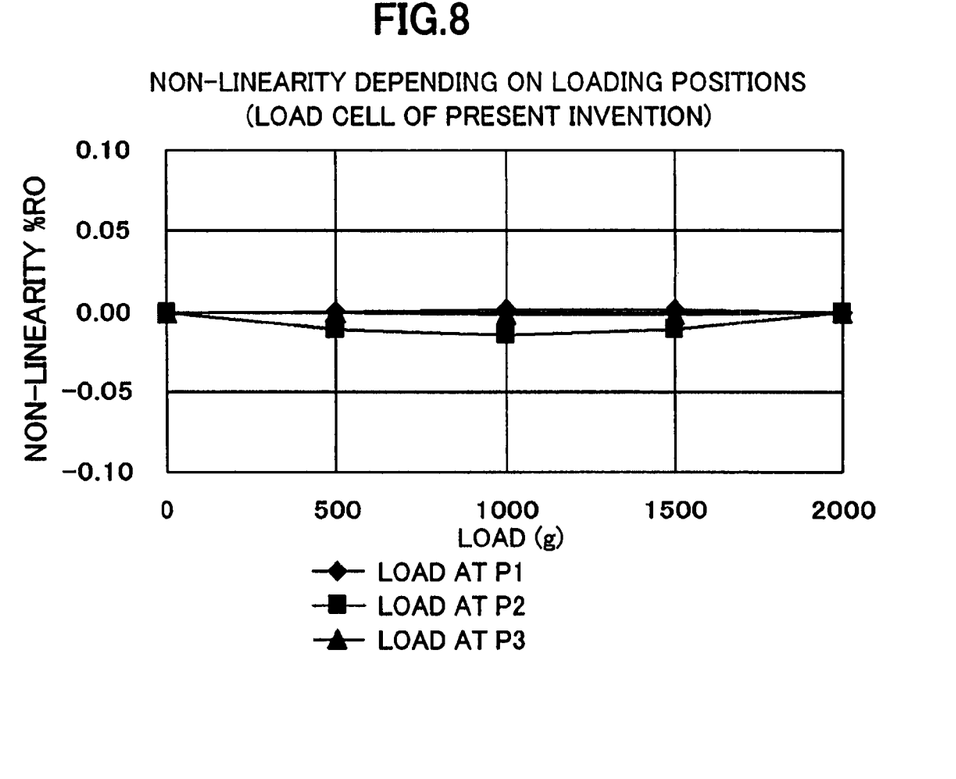
FIG. 8 is a graph illustrating non-linearity of the load cell according to Embodiment 1.

Referring to FIG. 7 illustrating non-linearity of the load cell of the prior art, the center loading position "P1" exhibits higher linearity of not greater than 0.02%, while the offset loading positions "P2" and "P3" exhibit non-linearity of 0.1% RO. In other words, the load cell of the prior art consisting of the arms and the strain-generating-portions functions insufficiently as Roberval mechanism.

Then, referring to FIG. 8 illustrating non-linearity of the load cell of the present invention, all the loading positions "P1", "P2" and "P3" exhibit the value within 0.02% RO, which indicates extremely higher linearity, and from which it is apparent that the second arm acts to balance any strain in the first arm.

Figure 9:
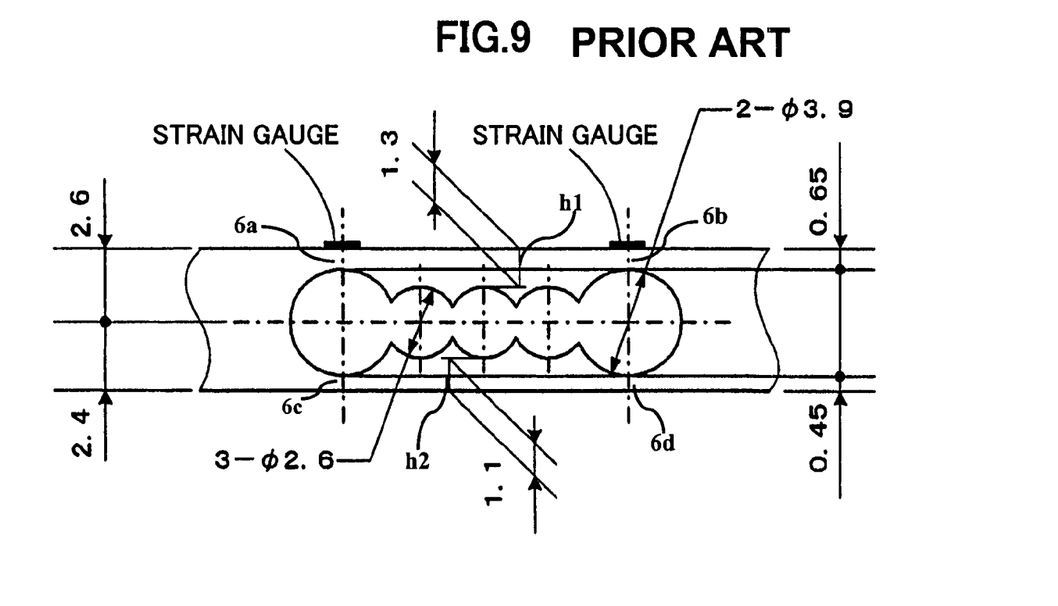
FIG. 9 is an enlarged view illustrating a main deform portion of a load cell of the prior art in which the thickness of strain-generating-portions and arms is changed.

On the other hand, when load is applied to the offset loading positions "P4" and "P5", the load cell is additionally subjected to twisting action, which is not solved by Roberval mechanism. Accordingly, in the load cell of the prior art, as described above, there may be degradation of linearity and presence of larger span error of load value at the offset loading position relative to the load value at the center loading position "P1". Therefore, when making comparison of offset loading error, a load cell as shown in FIG. 9 is used as an exemplary load cell that has any difference in thickness both between the upper and lower arms h1 and h2 and between upper and lower strain-generating-portions 6a, 6b and 6c, 6d, which has been described earlier as one of the prior art techniques. The load cell in FIG. 9 is prepared based on the load cell of the prior art in FIG. 4 in such way that the channel for forming the arms and the strain-generating-portions is downwardly displaced from the center line of the load cell by the distance of 0.1 mm in order to get the linearity substantially equivalent to the load cell of the present invention, as shown in FIGS. 1 and 2.

Figure 10:
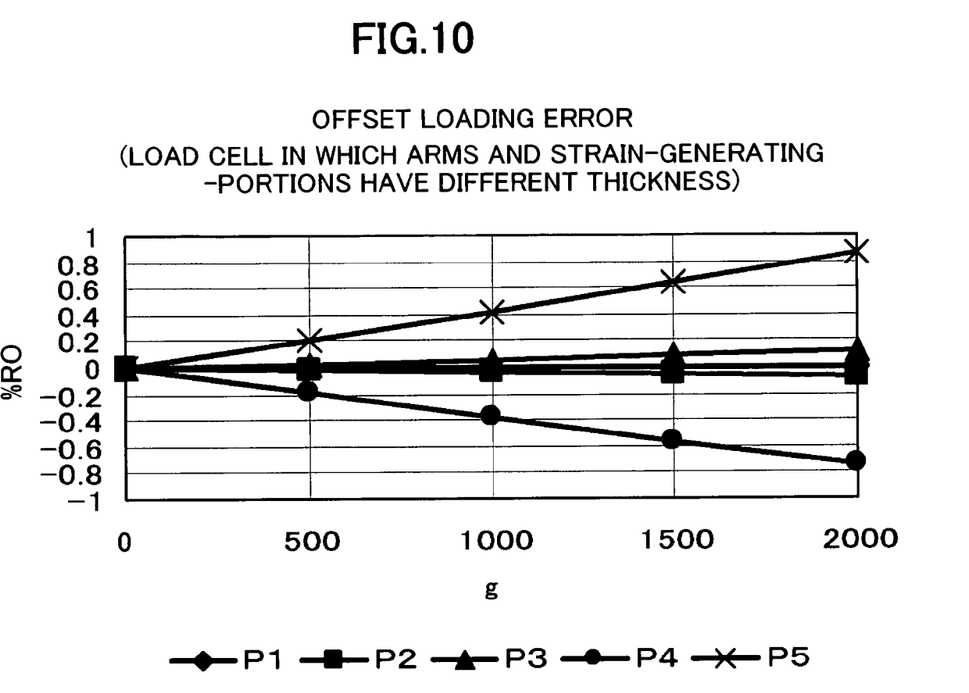
FIG. 10 is a graph illustrating offset loading error of the load cell in FIG. 9.
Figure 11:
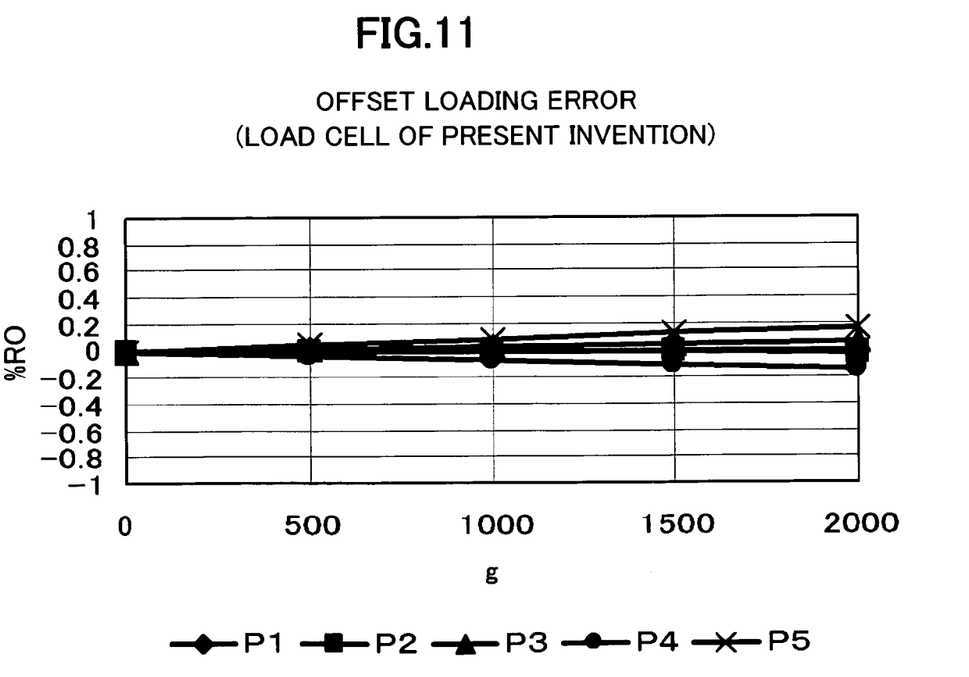
FIG. 11 is a graph illustrating offset loading error of the load cell according to Embodiment 1.

FIGS. 10 and 11 are graphs each illustrating offset loading error, i.e. % error of the load value at each of offset loading positions "P2", "P3", "P4" and "P5" relative to the load value at the center loading position "P1" of the load cell. In particular, FIG. 10 shows offset loading error of the load cell having difference in thickness between the arms and between the strain-generating-portions, as shown in FIG. 9, and FIG. 11 shows offset loading error of the load cell according to the present invention.

Referring to FIG. 10, the % error of the load value 2000 g at the offset loading positions "P2" and "P3" relative to the center loading position "P1" is shown within ±0.2% RO, which indicates excellent result. However, at the offset loading positions "P4" and "P5" where the load cell may be subjected to twisting force the % error is shown increased to +0.8% RO and −0.8% RO, respectively.

Then, referring to FIG. 11 illustrating the measurement result of the load cell of the present invention, the excellent result of within 0.2% RO is attained not only at the offset loading positions "P2" and "P3", but also at the offset loading positions "P4" and "P5" where the load cell of the prior art exhibits significant error.

Figure 12:
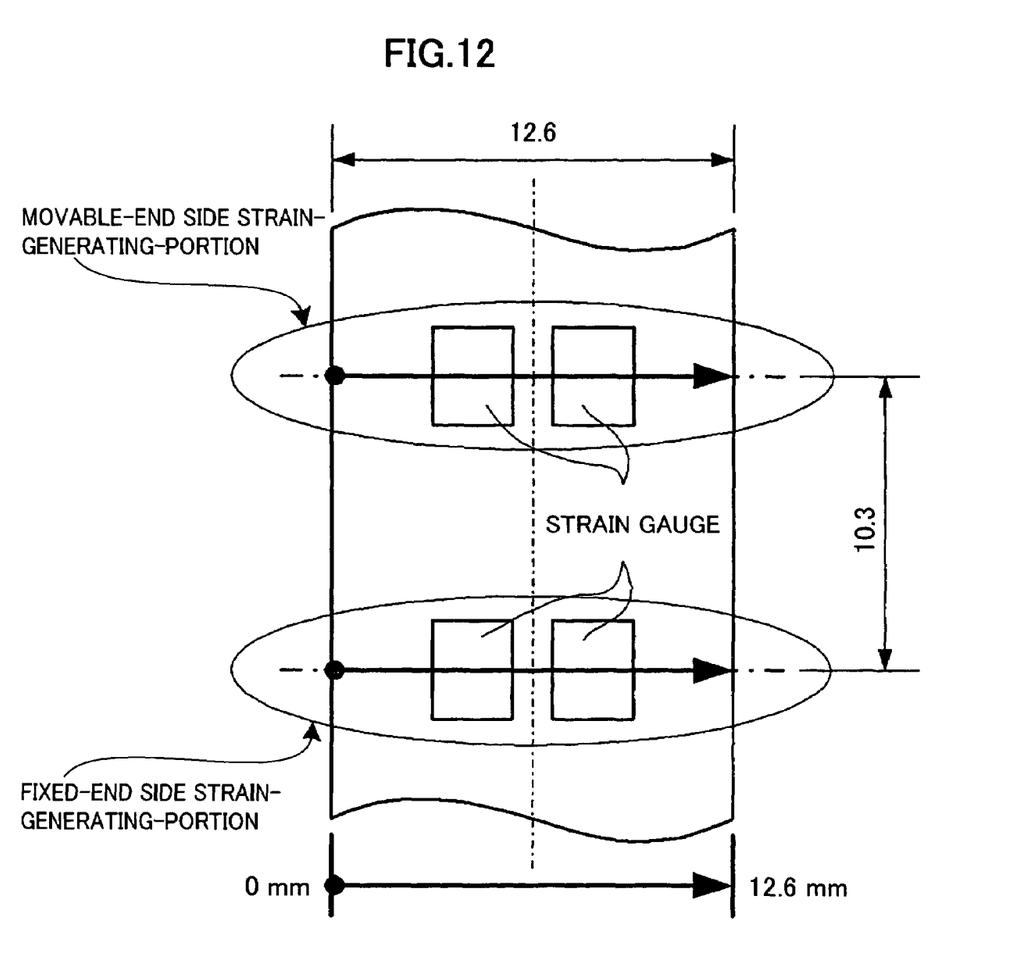
FIG. 12 is an enlarged view of main components on the strain gauge adhesion surface of the load cell.
Figure 13:
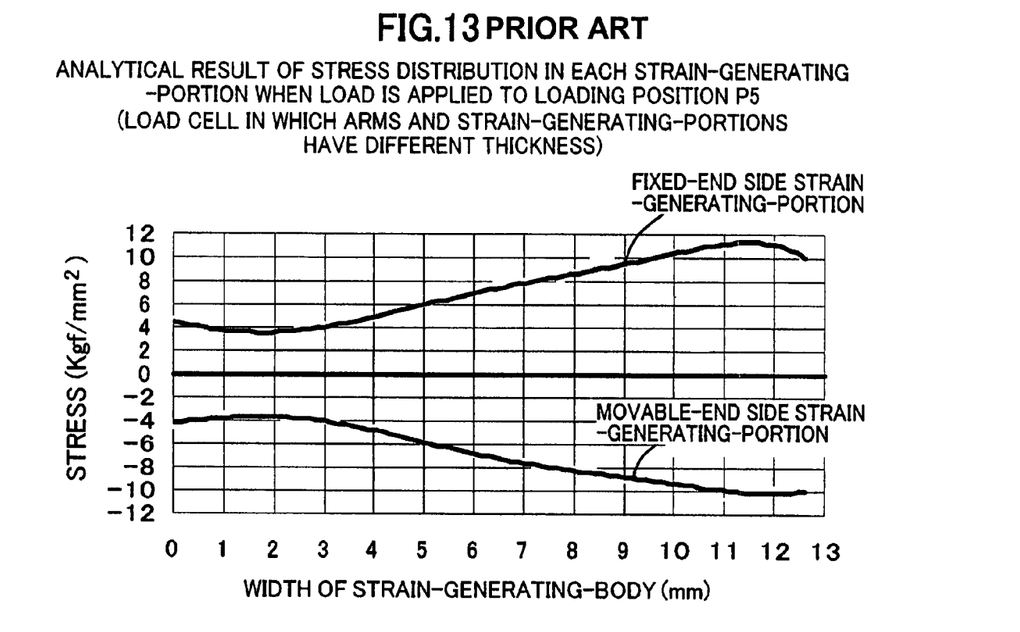
FIG. 13 is a graph illustrating analytical result of stress distribution on the strain-generating-portions of the load cell in FIG. 9 when load is applied to the offset loading position.

As the result, the load cell of the present invention can be considered to solve the problem of twisting action of the load cell. Then, reference will be made to FIGS. 12 to 14 each illustrating analytical result in which the twisting action in both load cells when load is applied to the offset loading position "P5" is analyzed as the stress. In particular, FIG. 12 is an enlarged view of the strain gauge adhesion surface of both load cells; FIG. 13 is a graph illustrating analysis of stress distribution on the strain gauge adhesion surface at the movable-end side and fixed-end side strain-generating-portions of the load cell in FIG. 9 when load is applied to the offset loading position "P5"; and FIG. 14 is similar to FIG. 13, but illustrating the case of the load cell of the present invention.

More particularly, the analysis of stress is performed in such manner that, on the strain gauge adhesion surface in FIG. 12, at each of the movable-end side and fixed-end side strain-generating-portions, the left edge of the load cell is assumed to be at 0 mm, while the right edge of the load cell is assumed to be at 12.6 mm, and the interval therebetween is divided by a step of 1 mm. Then, the stress at each of the points when load of 2000 g is applied to the position "P5" is calculated to produce each of approximated curves, which are shown in FIG. 13.

The factor to which attention should be paid is the difference between the maximum and minimum stress exerted on each of the strain-generating-portions on which the strain gauges are adhered. It can be said that greater the difference, stronger the twisting force applied to the load cell. Referring to FIG. 13, especially, to the stress analytical result for the fixed-end side strain-generating-portion, the minimum stress is about 3.5 kgf/mm$^2$ at the position about 1.5 mm away from the left edge of the load cell, while the maximum stress is about 11.5 kgf/mm$^2$ at the position about 11.5 mm away from the left edge of the load cell. Therefore, the difference in stress therebetween is about 3 times. Similarly, for the movable-end side strain-generating-portion, the maximum stress is about −3.5 kgf/mm$^2$ at the position about 1.5 mm away from the left edge of the load cell, while the minimum stress is about −10 kgf/mm$^2$ at the position about 12 mm away from the left edge of the load cell, and therefore, the difference in stress therebetween is about 2.8 times.

Figure 14:
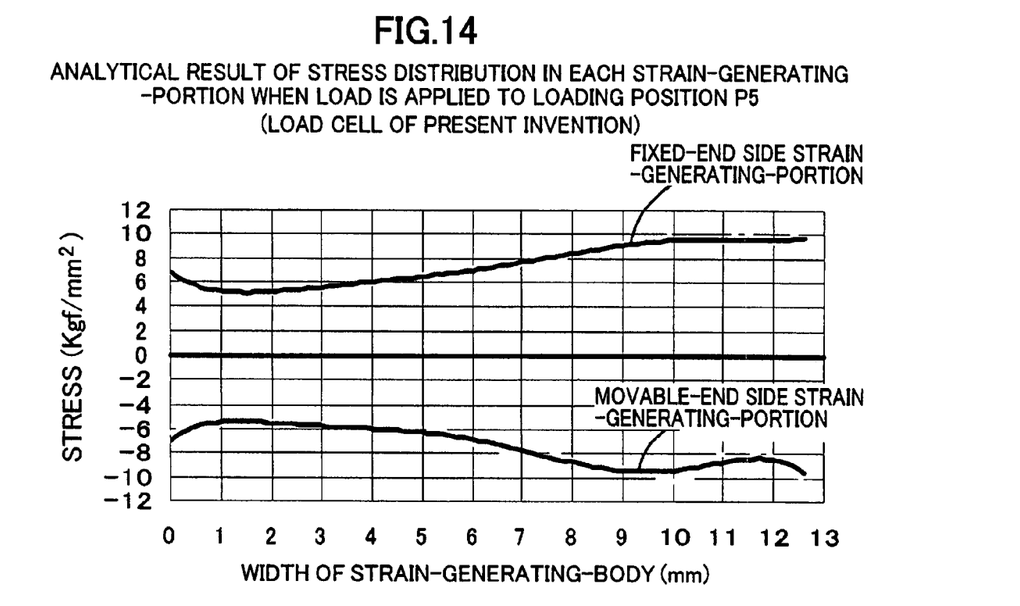
FIG. 14 is similar to FIG. 13, but illustrating the case of the load cell of Embodiment 1 of the present invention.

Then, reference is made to FIG. 14 illustrating the stress analytical result of the load cell according to the present invention. First, for the fixed-end side strain-generating-portion, the minimum stress is about 5 kgf/mm$^2$ at the position about 1.5 mm away from the left edge of the load cell, while the maximum stress is about 10 kgf/mm$^2$ at the position about 12.6 mm away from the left edge of the load cell, i.e. at the position of the right edge of the load cell. Therefore, the difference in stress therebetween is about 2 times. Similarly, for the movable-end side strain-generating-portion, the maximum stress is about −5.5 kgf/mm$^2$ at the position about 1.5 mm away from the left edge of the load cell, while the minimum stress is about −9.5 kgf/mm$^2$ at the position about 10 mm away from the left edge of the load cell, and therefore, the difference in stress therebetween is about 1.7 times.

It is apparent from the forgoing that the load cell of the prior art in which the thickness of strain-generating-portions is adjusted provides the difference in stress of about 3 times. In contrast thereto, the present invention provides the reduced difference in stress of about 2 times, from which it is apparent that any effect of twisting action of the strain-generating-body against the strain-generating-portions on which the strain gauges are adhered has been mitigated.

Embodiment 2

The present invention additionally provides Embodiment 2 in which a highly precise load cell is realized simply by adjusting the thickness of a second arm. In Embodiment 1, as described above, on the basis of a load cell in which a channel for forming strain-generating-portions and arms is formed from a plurality of round apertures in a strain-generating-body, an axis of the channel is displaced while keeping the width of the channel to provide different thickness for the upper and lower arms. In contrast thereto, Embodiment 2 of the present invention provide another load cell in which a second arm is only made thinner to widen a channel so that different thickness is provided for first and second arms. Embodiment 2 is useful especially for a relatively large load cell in which both arm have sufficient thickness.

Figure 15:
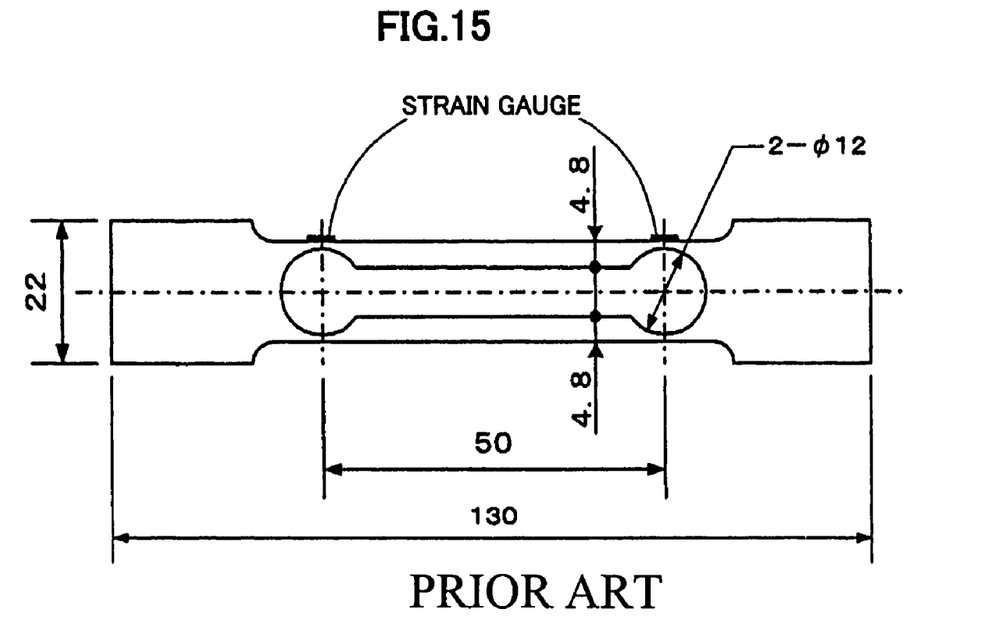
FIG. 15 is a side view of a load cell of the prior art in which the thickness of strain-generating-portions and arms is symmetrical.
Figure 16:
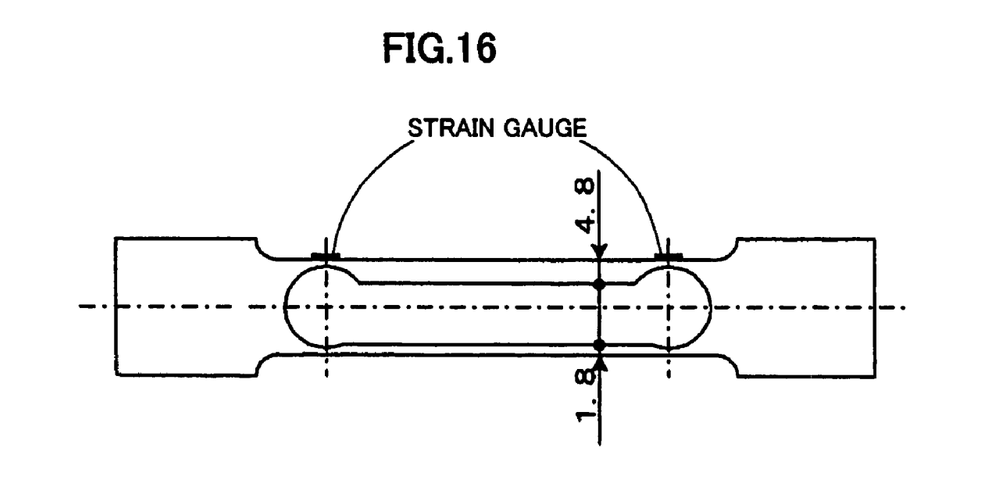
FIG. 16 is a side view of a load cell according to Embodiment 2 of the present invention.

FIG. 15 illustrates a load cell of the prior art in which arms h1 and h2 have same thickness, and strain-generating-portions 6a, 6b, 6c and 6d have same thickness. In particular, a strain-generating-body having length 1300 mm and height 22 mm is provided with two apertures of φ12 mm at the center portion thereof with 50 mm spacing therebetween to form movable-end side and fixed-end side strain-generating-portions and with a channel for coupling the apertures together and for making the arms to have thickness of 4.8 mm. FIG. 16 illustrates a load cell of the present invention, manufactured on the basis of the load cell in FIG. 15, with such modification that the second arm is cut to have the reduced thickness of 1.8 mm for providing stable linearity, and to makes wider the channel between the first and second arms than that of the prior art load cell. The strain gauges are provided in the same manner as Embodiment 1 to configure the bridge circuit.

Figure 17:
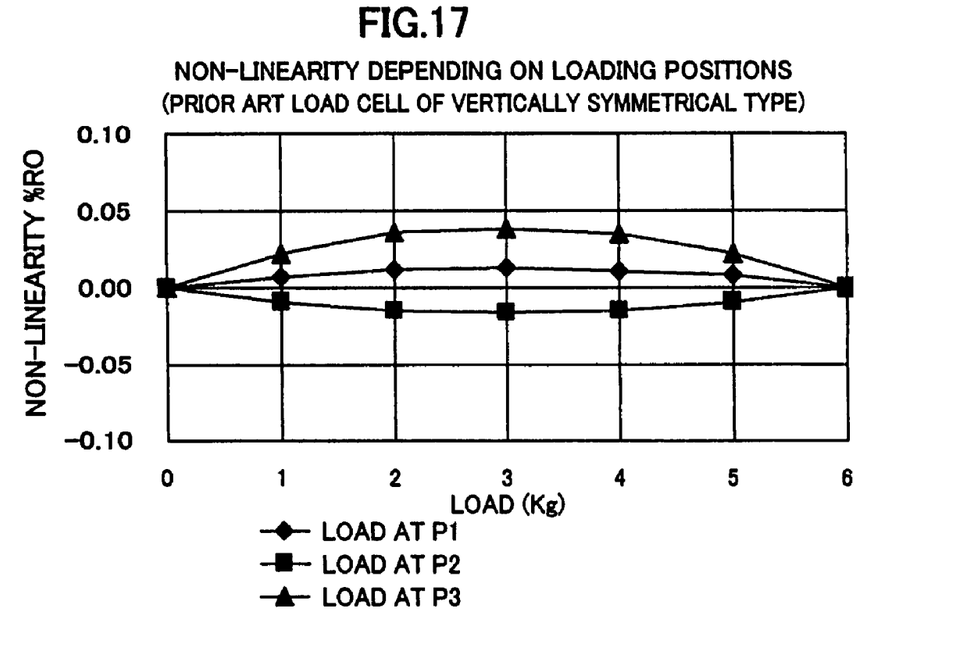
FIG. 17 is a graph illustrating non-linearity of the load cell of the prior art in FIG. 15.
Figure 18:
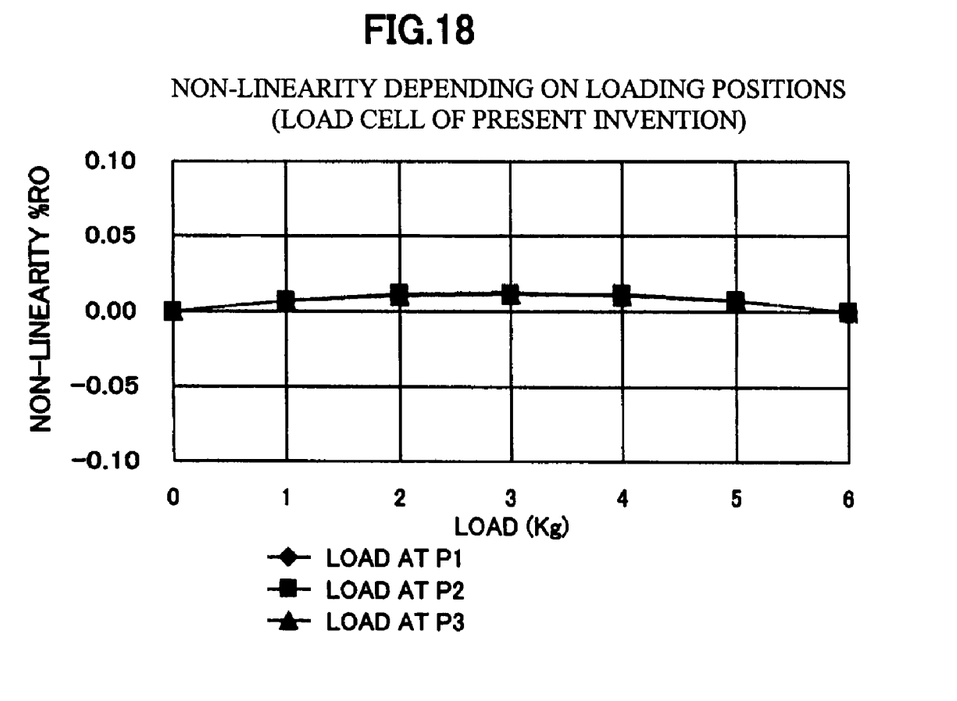
FIG. 18 is a graph illustrating non-linearity of the load cell according to Embodiment 2 of the present invention.

Non-linearity of the load cells in FIGS. 15 and 16 is measured in the same manner as Embodiment 1 to produce the results, as shown in FIGS. 17 and 18, respectively. It is apparent from FIG. 17 that the prior art load cell provides non-linearity of about 0.01% RO at the loading position "P1", but greater non-linearity of about 0.02% RO and 0.04% RO at the loading positions "P2" and "P3", respectively.

In contrast thereto, as shown in FIG. 18, the load cell of the present invention provides substantially consistent excellent result of non-linearity of about 0.01% RO at all the loading positions "P1", "P2" and "P3". This clearly exhibits that it is only necessary for the second arm to have some proper difference in thickness for balancing any strain in the strain-generating-portions on which the strain gauges are adhered, simply by reducing the thickness of the second arm.

In Embodiment 1 and Embodiment 2 the load cell has been described as having such configuration that the load cell is fixed with a strain gauge adhesion surface of the first arm vertically upwardly directed, and a load is vertically downwardly applied from over the first arm. Alternatively, reversed configuration of the load cell may be embodied in which the load cell is fixed with a strain gauge adhesion surface of the first arm vertically downwardly directed, and a load is applied from over the second arm which is now at upper side.

Furthermore, the strain gauges have been described above as being provided in such manner that two strain gauges are adhered to each of two strain-generating-portions coupled through the first arm so that total four strain gauges are connected to form a bridge circuit. Alternatively, a single strain gauge may be adhered to each of two strain-generating-portions so that total two strain gauges are electrically associated with two dummy gauges to form a bridge circuit which still can provide an equivalent characteristic.

What is claimed is:

1. A load cell comprising a Roberval mechanism comprising two parallel arms between a fixed end and a movable end, and four strain-generating-portions disposed such that two of the strain-generating-portions are coupled to each other by each of said two arms, wherein said four strain-generating-portions are of equal thickness;

said two arms comprise a first arm having strain gauges adhered to each of said two strain-generating-portions coupled to each other, and a second arm having a thickness smaller than a thickness of the first arm;

the first arm has a strain gauge adhesion surface on an outer surface facing away from the second arm; and the strain gauges are attached to the strain gauge adhesion surface.

2. A load cell according to claim 1, wherein the first arm is for supporting a load vertically downwardly applied from over the first arm when the strain gauge adhesion surface of said first arm is vertically upwardly directed.

3. A load cell according to claim 1 or 2 in which said second arm is formed such that a longitudinal axis of a channel between the two arms is displaced from a longitudinal axis of the load cell itself by a predetermined distance.

4. A load cell according to claims 1 or 2, wherein the thickness of the first arm is at least three times the thickness of the second arm.

* * * * *